(12) United States Patent
Carr (10) Patent No.: US 10,184,852 B2
(45) Date of Patent: Jan. 22, 2019

(54) SENSOR SYSTEM COMPRISING MULTIPLEXED FIBER-COUPLED FABRY-PEROT SENSORS

(71) Applicant: Micron Optics, Inc., Atlanta, GA (US)

(72) Inventor: Dustin Wade Carr, Marietta, GA (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 0 days.

(21) Appl. No.: 15/632,888

(22) Filed: Jun. 26, 2017

(65) Prior Publication Data

US 2017/0356767 A1 Dec. 14, 2017

Related U.S. Application Data

(63) Continuation of application No. 14/602,563, filed on Jan. 22, 2015, now Pat. No. 9,689,714.

(60) Provisional application No. 61/930,068, filed on Jan. 22, 2014.

(51) Int. Cl.
| | |
|---|---|
| *G01L 9/00* | (2006.01) |
| *G01D 5/26* | (2006.01) |
| *G01H 9/00* | (2006.01) |
| *G01D 5/353* | (2006.01) |

(52) U.S. Cl.
CPC ............ *G01L 9/0079* (2013.01); *G01D 5/266* (2013.01); *G01D 5/268* (2013.01); *G01D 5/35306* (2013.01); *G01D 5/35383* (2013.01); *G01H 9/004* (2013.01)

(58) Field of Classification Search
CPC ......... G01L 1/246; G01L 1/247; G01B 11/18; G01D 5/34316; G01D 5/35383; G01D 5/35312; G01H 9/004; G01H 9/006; G01N 2021/779

USPC ................ 356/477, 478, 479, 519
See application file for complete search history.

(56) References Cited

U.S. PATENT DOCUMENTS

| | | | |
|---|---|---|---|
| 5,748,312 A | 5/1998 | Kersey et al. | |
| 5,987,197 A | 11/1999 | Kersey | |
| 6,466,706 B1 | 10/2002 | Go et al. | |

(Continued)

OTHER PUBLICATIONS

"Notice of Allowance" issued in co-pending U.S. Appl. No. 14/602,563, dated Apr. 6, 2017.

(Continued)

*Primary Examiner* — Michael P LaPage
(74) *Attorney, Agent, or Firm* — Kaplan Breyer Schwarz, LLP (57) ABSTRACT

A sensor network having a series arrangement of fiber-coupled, reflective sensors is disclosed. In operation, a first light signal having multiple wavelength bands is launched in an upstream direction on a fiber bus. Each sensor includes a wavelength filter and an FP sensor that is sensitive to a parameter. Each wavelength filter (1) selectively passes a different one of the wavelength bands to its FP sensor and (2) reflects the remaining wavelength bands back into the fiber bus to continue upstream. The FP sensor imprints a signal based on the parameter onto its received light and reflects it as a second light signal. The collimator, wavelength filter, and FP sensor of each sensor are arranged such that each second light signal is returned to the fiber bus, which conveys them in a downstream direction to a processor that measures them and estimates the parameter at each sensor.

15 Claims, 8 Drawing Sheets

(56) References Cited

U.S. PATENT DOCUMENTS

| | | | | |
|---|---|---|---|---|
| 7,027,136 B2* | 4/2006 | Tsai | .................... | G01B 11/161 |
| | | | | 356/73.1 |
| 7,864,329 B2* | 1/2011 | Berthold | ............ | G01D 5/35303 |
| | | | | 356/478 |
| 7,940,400 B2* | 5/2011 | Lopushansky | ......... | G01D 5/268 |
| | | | | 356/480 |
| 2004/0202400 A1* | 10/2004 | Kochergin | ......... | G01D 5/35316 |
| | | | | 385/12 |
| 2005/0046859 A1* | 3/2005 | Waagaard | .............. | G01B 11/18 |
| | | | | 356/478 |
| 2006/0139652 A1 | 6/2006 | Berthold | | |
| 2007/0206202 A1* | 9/2007 | Carr | ....................... | G01H 9/006 |
| | | | | 356/519 |
| 2008/0106745 A1 | 5/2008 | Haber et al. | | |
| 2008/0123467 A1 | 5/2008 | Ronnekleiv et al. | | |
| 2010/0302549 A1 | 12/2010 | Menezo et al. | | |
| 2013/0148691 A1 | 6/2013 | Qiu et al. | | |

OTHER PUBLICATIONS

"Office Action" issued in co-pending U.S. Appl. No. 14/602,563, dated Jun. 27, 2016.
"Office Action" issued in co-pending U.S. Appl. No. 14/602,563, dated Sep. 9, 2016.

* cited by examiner

SENSOR SYSTEM COMPRISING MULTIPLEXED FIBER-COUPLED FABRY-PEROT SENSORS

RELATED APPLICATIONS

This application is a continuation of co-pending U.S. patent application Ser. No. 14/602,563, filed Jan. 22, 2015, which claims the benefit of U.S. Provisional Application No. 61/930,068 filed Jan. 22, 2014. The entire disclosure of each of U.S. patent application Ser. No. 14/602,563 and U.S. Provisional Application No. 61/930,068 is incorporated herein by reference.

FIELD OF THE INVENTION

The present invention relates to sensors in general, and, more particularly, to optical sensing systems.

BACKGROUND OF THE INVENTION

A sensor is a device that is designed to detect changes in a quantity (i.e., a measurand) and provide a corresponding output. All-optical, fiber-coupled sensors have many advantages over many other conventional sensors (e.g., acoustic sensors, etc.), such as small size and weight, ability to operate in chemically and/or electrically harsh environments, ease of multiplexing large numbers of sensors, and compatibility with fiber-optic networks for data transport and processing. They are therefore attractive for use in many applications.

Such sensor networks often rely upon fiber-Bragg grating ("FBG") sensors to measure a measurand (e.g., temperature and/or strain). It is relatively easy to integrate multiple FBG sensors in a single-fiber network because each sensor has only a limited number of operating wavelengths. Prior-art FBG sensor systems usually employ swept-wavelength sources so that all of the sensors in the network can be interrogated by a single source. Although easy to implement, the dynamic range of a typical FBG sensor is relatively poor and this has limited their deployment in many applications.

Fabry-Perot ("FP") cavity-based sensors are often used in applications in which the limitations of FBG sensors are not easily overcome. FP sensors are widely used, for example, in many optical-sensor-based accelerometer and pressure sensing applications. But FP sensors are not without their own limitations. For instance, it is challenging to multiplex FP sensors in a single-fiber network because of inter-sensor interference.

An optical-sensor based network that has high dynamic range and is easily implemented would provide an attractive alternative to sensor networks known in the prior art.

SUMMARY OF THE INVENTION

The present invention enables a sensor network without some of the costs and disadvantages of the prior art. An embodiment of the present invention includes one or more FP sensors, where each FP sensor is operatively coupled with a wavelength-selective filter that limits the wavelengths upon which the FP sensor operates. As a result, a single-fiber network can include multiple sensors without giving rise to inter-sensor interference that can degrade the signal-to-noise ratio of the system.

An illustrative embodiment of the present invention includes a light source that launches a range of wavelengths, comprising a plurality of wavelength bands, onto an optical fiber bus (hereinafter referred to as a "fiber bus") to which a plurality of sensors is optically coupled. Each sensor operates in reflection mode to reflect a signal back into the fiber bus, where the reflected signal from each sensor is within a different wavelength band that is uniquely identified with that sensor. A wavelength-response function for each sensor is then determined from its respective reflected signal and analyzed to determine a value for the measurand for which that sensor is sensitive. In some embodiments, each of the sensors is sensitive for the same measurand. In some embodiments, at least one of the sensors is sensitive for a first measurand and at least one of sensors is sensitive for a second measurand.

Each sensor includes a Fabry-Perot cavity that is optically coupled with a reflective wavelength filter, where each of the wavelength filters is selectively transmissive for a different one of the plurality of wavelength bands. As a result, each of the Fabry-Perot cavities receives a different one of the plurality of wavelength bands. At each sensor, the wavelength filter is optically coupled with the fiber bus via a serially coupled dual-fiber collimator. The collimator receives light from the source on a first fiber portion and couples light reflected from the wavelength filter into a second fiber portion. Light reflected by the wavelength filter returns through the second fiber portion to the fiber bus, which conveys the reflected light to the next sensor in line.

Light transmitted by the wavelength filter is received by the Fabry-Perot cavity, which reflects a portion of this light. The (light) signal reflected from the cavity is based on its cavity length, which is a function of the magnitude of the measurand for which that sensor is sensitive. The Fabry-Perot cavity and the wavelength filter are arranged such that this reflected signal returns through the first fiber portion to the fiber bus, which then conveys the reflected signal to a receiver and processor.

The receiver receives the reflected signal from each sensor in a different wavelength band and the processor processes each received reflected signal to determine the wavelength at which a minima occurs in its respective wavelength band. The spectral position of each minima is then used to determine the cavity length of each Fabry-Perot cavity and, thus, a value for the measurand of interest at each sensor.

In some embodiments, the light source is a swept-wavelength source. In some other embodiments, the light source is a broadband source.

A method in accordance with the present invention is suitable for measuring the wavelength-response function for each sensor and dynamically determining the magnitude of the measurand being measured by each sensor. In some embodiments, the method comprises processing a light signal reflected by a sensor and determining the wavelength at which the light signal exhibits a minima. The method further determines the cavity length of the Fabry-Perot cavity included in the sensor and estimates a magnitude for its respective measurand based on this cavity length. Changes in the wavelength are then monitored and used to determine changes in the measurand over time.

An embodiment of the present invention is a sensor network comprising: (1) a source, the source being operative for providing a first light signal that includes a first plurality of wavelength bands; (2) a fiber bus; and (3) a plurality of sensors, each sensor being a reflective sensor that is optically coupled with the fiber bus, and each sensor comprising; (a) a wavelength filter; and (b) a Fabry-Perot (FP) sensor that is optically coupled with the wavelength filter, the FP sensor being sensitive for one of a plurality of measurands; wherein each wavelength filter of the plurality thereof is operative for selectively providing a different one of a second plurality of wavelength bands to its respective FP sensor, and wherein the first plurality of wavelength bands includes the second plurality of wavelength bands.

DETAILED DESCRIPTION

Figure 1:
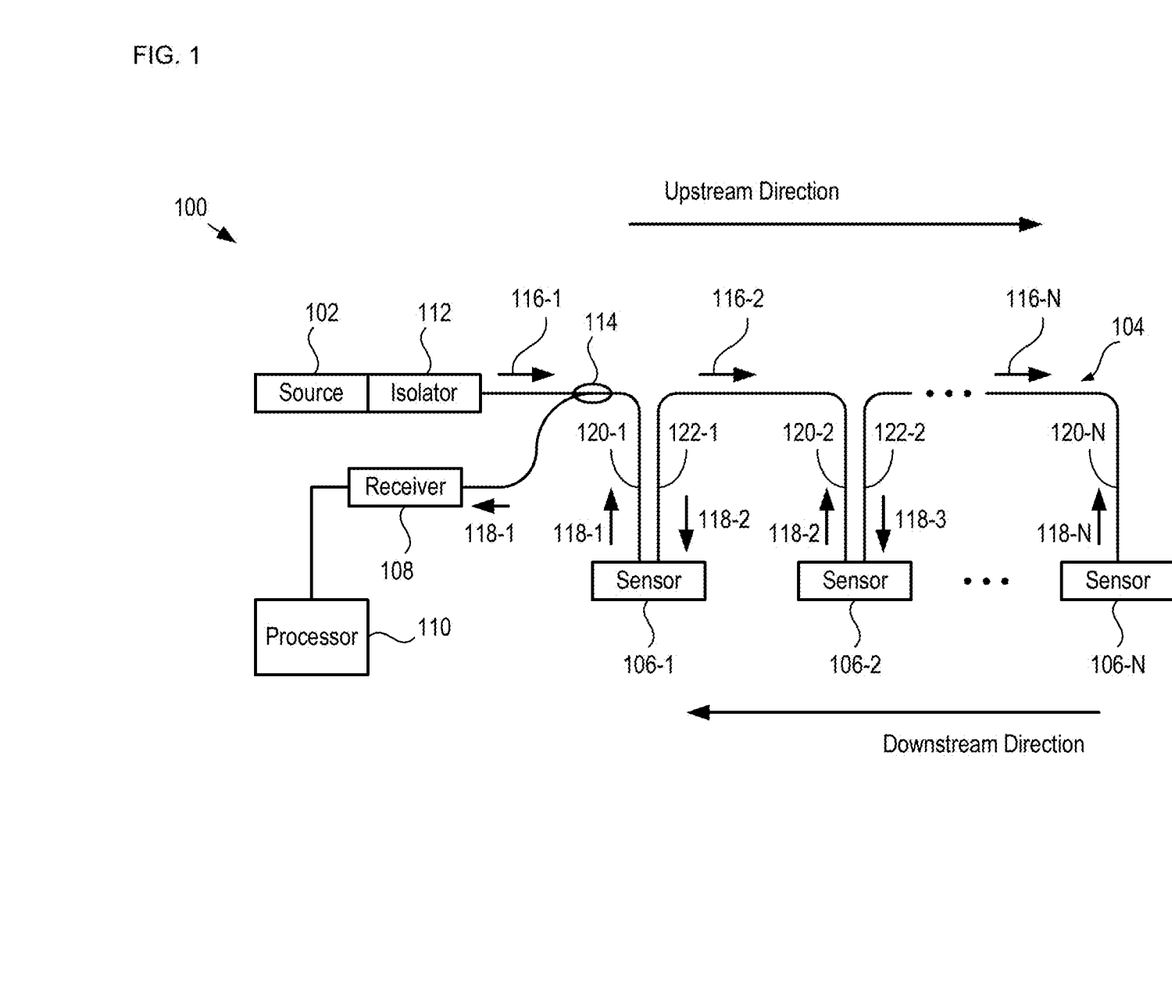
FIG. 1 depicts a schematic drawing of a sensor network in accordance with an illustrative embodiment of the present invention.

FIG. 1 depicts a schematic drawing of a sensor network in accordance with an illustrative embodiment of the present invention. Network 100 is a distributed pressure-sensor network operative for providing a spatial map of pressure based on measurements made at N locations. In some embodiments, network 100 is operative for monitoring a plurality of measurands at one or more locations. In some embodiments, network 100 is operative for monitoring one or more measurands at one or more locations. For the purposes of this Specification, including the appended claims, a "measurand" is defined as the quantity measured by a sensor.

Network 100 includes source 102, fiber bus 104, sensors 106-1 through 106-N, receiver 108, and processor 110, interrelated as shown. It will be clear to one skilled in the art, after reading this Specification, how to specify, make, and use alternative embodiments wherein a network includes any practical number of sensors.

Figure 2:
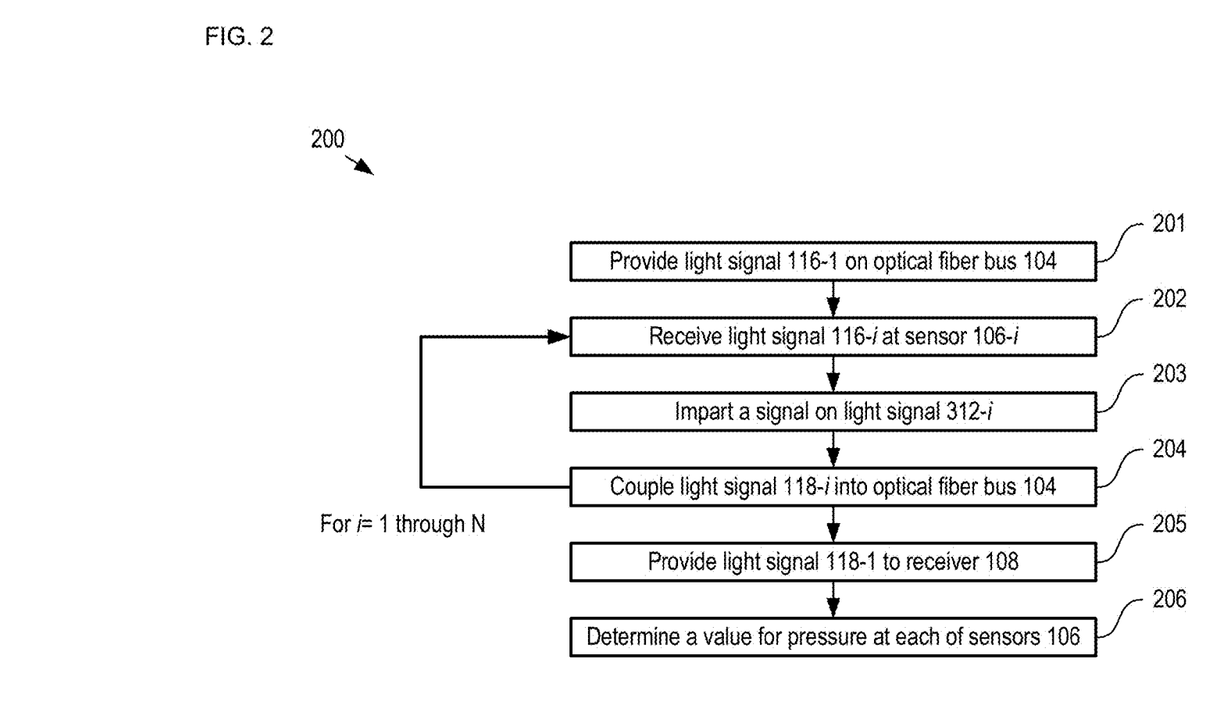
FIG. 2 depicts operations of a method for measuring a measurand in accordance with the illustrative embodiment of the present invention.

FIG. 2 depicts operations of a method for measuring a measurand in accordance with the illustrative embodiment of the present invention. Method 200 begins with operation 201, wherein light signal 116-1 is provided on fiber bus 104. Method 200 is described herein with continuing reference to FIG. 1, as well as to FIGS. 3-7.

Source 100 is a broadband source that provides light signal 116-1 to fiber bus 104 via isolator 112. Light signal 116-1 has a spectral width greater than or equal to the combined wavelength range of sensors 106-1 through 106-N (referred to, collectively, as sensors 106). As a result, light signal 116-1 includes light within N wavelength bands (i.e., wavelength bands λ1 through λN), where each wavelength band spans at least one free-spectral range of the FP sensor included in a corresponding sensor 106, as discussed below and with respect to operation 206. In some embodiments, source 100 is a swept-wavelength source that sweeps the wavelength of light signal 116-1 through a range of wavelengths equal or greater than the combined wavelength range of sensors 106.

At operation 202, for each of i=1 through N, sensor 106-$i$ receives light signal 116-$i$.

Figure 3:
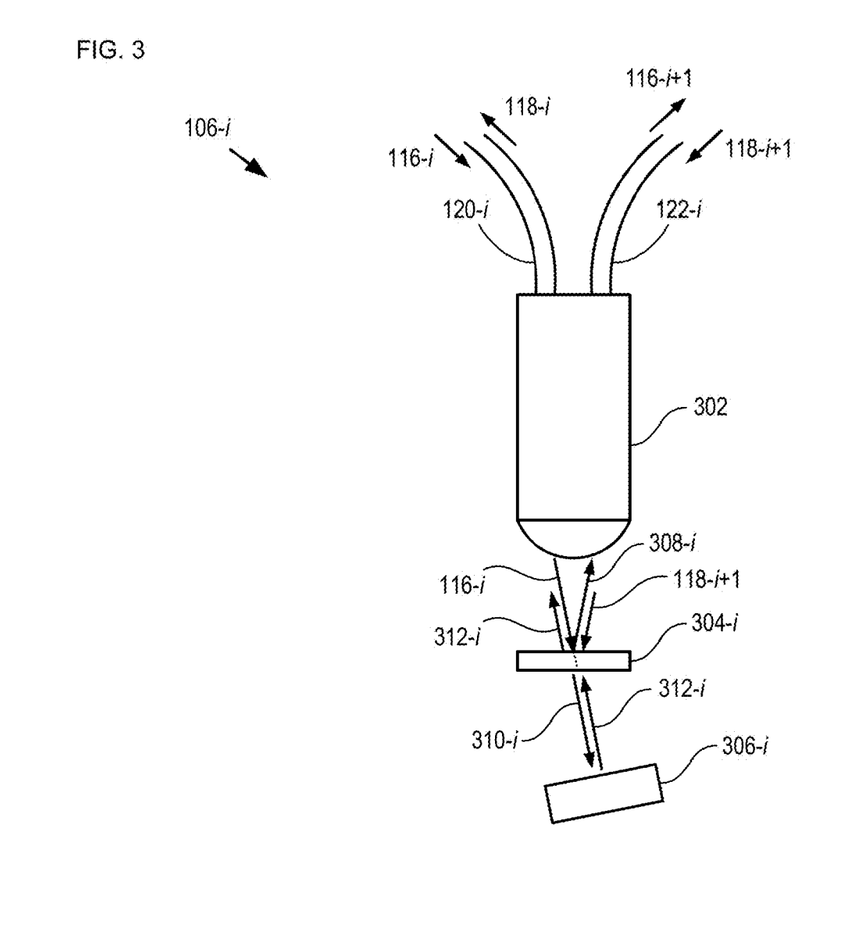
FIG. 3 depicts a sensor in accordance with the illustrative embodiment of the present invention.

FIG. 3 depicts a sensor in accordance with the illustrative embodiment of the present invention. Sensor 106-$i$ is representative of each of sensors 106. Sensor 106-$i$ comprises input fiber portion 120-$i$ and output fiber portion 122-$i$, collimator 302, wavelength filter 304-$i$, and FP sensor 306-$i$. In the illustrative embodiment, each of sensors 106 is operative for sensing pressure. In some embodiments, at least one of sensors 106 is operative for measuring a different measurand, such as strain, acceleration, gravity, the presence of a chemical, temperature, magnetic field, and the like. In some embodiments, each of sensors 106 is operative for measuring a different measurand.

Light signal 116-$i$ is conveyed to collimator 302 via input fiber portion 120-$i$. It should be noted that each light signal 116-$i$ includes all of the wavelength bands in light signal 116-1 except for those removed by the wavelength filters of each upstream sensors 106, as discussed below and with respect to operation 204.

Collimator 302 is a conventional dual-fiber collimator suitable for use in the wavelength range of light signal 116-1. Collimator is optically coupled with input fiber portion 120-$i$ and output fiber portion 122-$i$ such that the collimator operates in pupil-division mode.

Collimator 302 provides light signal 116-$i$ to wavelength filter 304-$i$.

Wavelength filter 304-$i$ is a thin-film wavelength filter that selectively passes wavelength band λ$i$ to FP sensor 306-$i$ as light signal 310-$i$ and reflects the remaining light in light signal 116-$i$ back into collimator 302 as light signal 308-$i$. Light signal 308-$i$ is then coupled back into fiber bus 104 as light signal 116-$i$+1 via output fiber portion 122-$i$.

Because wavelength filter 304-$i$ passed wavelength band λ$i$ to FP sensor 306-$i$, light signal 116-$i$+1 no longer contains this wavelength band. In other words, as light signal 116 travels upstream through the series of sensors 106, it contains fewer of the wavelength bands originally contained in light signal 116-1. For example, light signal 116-1 includes all of wavelength bands λ1 through λN when it arrives at sensor 106-1. After passing through sensor 106-1, however, light signal 116-2 contains only wavelength bands λ2 through λN. This process continues at each successive sensor along fiber bus 104 until light signal 116 reaches sensor 106-N, at which it contains only wavelength band λN.

FP sensor 306-$i$, wavelength filter 304-$i$ and collimator 302 are arranged such that FP sensor 306-$i$ reflects a portion of light signal 310-$i$ as light signal 312-$i$, which is coupled back into collimator 302 through the wavelength filter. Collimator 302 then couples light signal 312-$i$ into input fiber portion 120-$i$.

At operation 203, FP sensor 306-$i$ imparts a signal onto light signal 312-$i$, where the signal depends on the pressure sensed by sensor 106-$i$.

Figure 4:
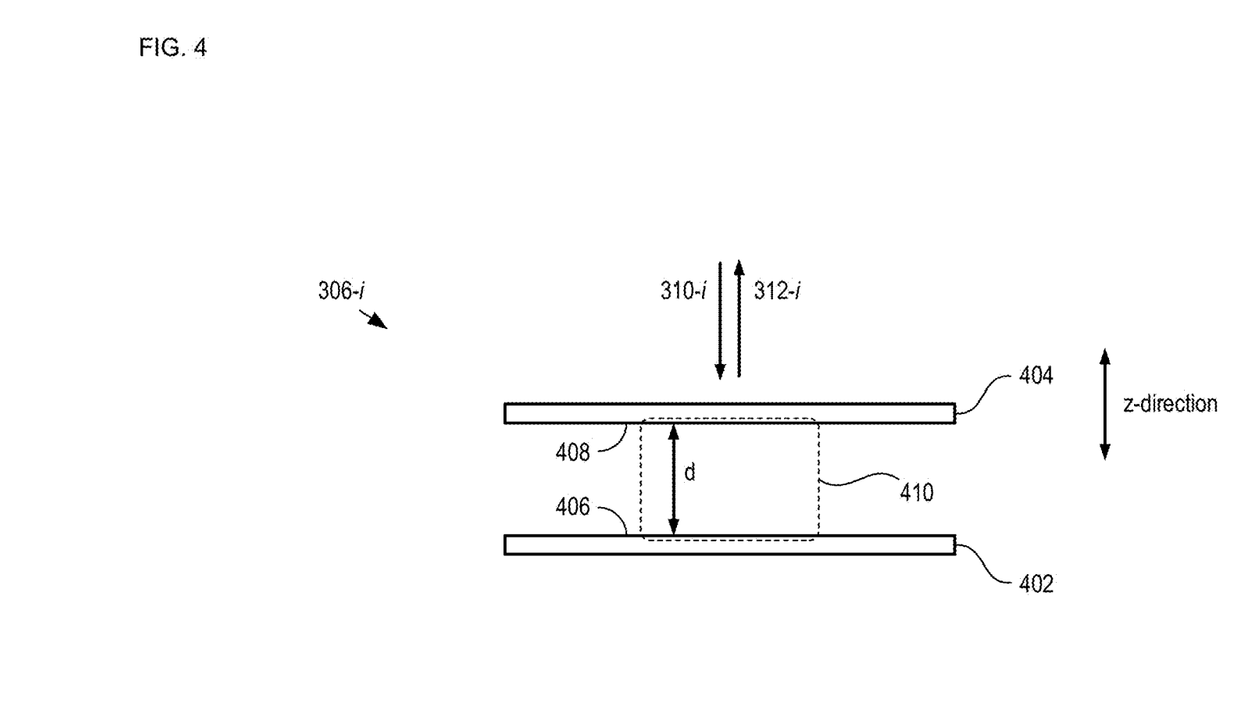
FIG. 4 depicts a schematic drawing of a side view of an FP sensor in accordance with the illustrative embodiment of the present invention.

FIG. 4 depicts a schematic drawing of a side view of an FP sensor in accordance with the illustrative embodiment of the present invention. FP sensor 306-$i$ includes stationary layer 402 and movable layer 404.

Stationary layer 402 is a partially reflective mirror layer having reflectance of 50%. Stationary layer 402 includes surface 406.

Movable layer 404 is a partially reflective mirror layer having reflectance of 50% for the wavelengths in light signal 116-1. Movable layer 404 includes surface 408.

Surfaces 406 and 408 collectively define optically resonant cavity 410, which has a cavity length, d, equal to the separation between these surfaces. One skilled in the art will recognize that the response of optically resonant cavity 410 depends on the reflectance of the two mirrors that form the optical cavity, and cavity length, d, as follows:

$$T = \frac{1}{1 - F\sin^2\frac{\phi}{2}}$$

$$R = 1 - T$$

$$F = \frac{4R_0}{(1 - R_0)^2}$$

$$\phi = \frac{4\pi d}{\lambda}$$

where T is the transmitted fraction of light, R is the reflected fraction, $R_0$ is the reflectance of each mirror in the cavity, d is the distance between the mirrors (i.e., cavity length), and $\lambda$ is the wavelength of the light.

Movable layer 404 is held above stationary layer 402 such that its position along the z-direction is based on magnitude of the measurand for which sensor 106-$i$ is sensitive (i.e., in this example, pressure). As a result, cavity length, d, is a function of pressure and the wavelength-response function (WRF) of reflected light signal 312-$i$ is, therefore, indicative of the pressure at sensor 106-$i$.

One skilled in the art will recognize that there are myriad ways in which movable layer 404 can be supported/suspended above stationary layer 402 and that the support/suspension means will depend on the measurand being sensed by the FP sensor and/or the desired sensor sensitivity. Examples of optically resonant cavities having a movable layer are disclosed in U.S. Pat. Nos. 7,355,723, 7,583,390, 7,359,067, 7,551,295, and 7,626,707, each of which is incorporated herein in its entirety. Further, it should be noted that the design of FP sensor 306-$i$ is merely exemplary and that alternative design characteristics, such as $R_0$, d, $\lambda$, etc., are within the scope of the present invention.

Although the illustrative embodiment includes an FP sensor whose cavity length is sensitive to pressure, it will be clear to one skilled in the art, after reading this Specification, how to specify, make, and use alternative embodiments of the present invention wherein cavity length, d, is sensitive to any of a plurality of measurands that includes acceleration, motion, temperature, strain, force, density, angle, a chemical or biological component, light, radiation, gas flow, mass flow, nuclear energy, magnetic field, gravity, humidity, moisture, vibration, electrical fields, sound, or any other physical aspect of an environment.

Figure 5:
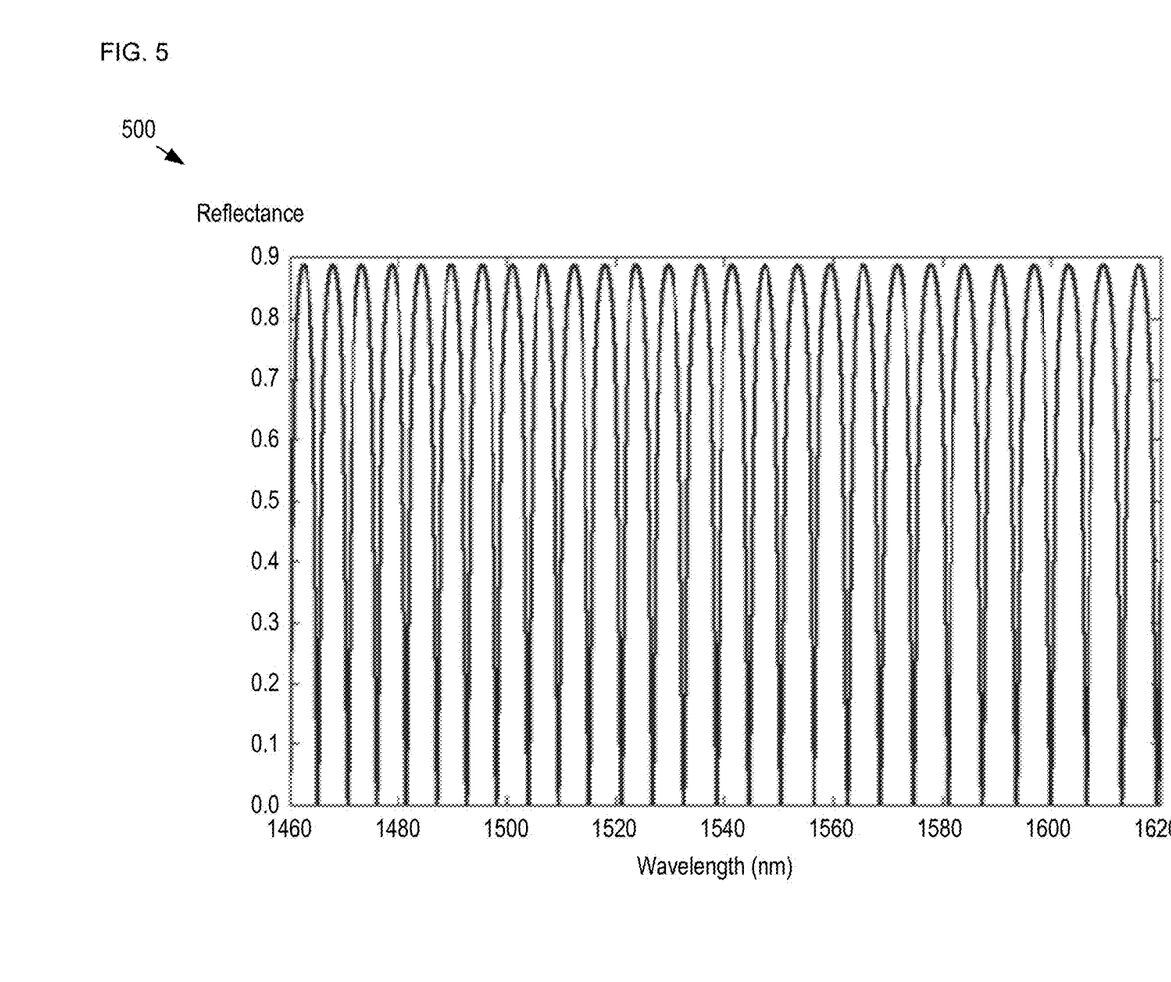
FIG. 5 depicts a typical theoretical response function of an FP sensor in accordance with the illustrative embodiment of the present invention.

FIG. 5 depicts a typical theoretical response function of an FP sensor in accordance with the illustrative embodiment of the present invention. Plot 500 shows the intensity of light signal 312-$i$ for an exemplary FP sensor 306-$i$ having a cavity length of 200 microns and mirror reflectance of 50%.

At operation 204, sensor 106-$i$ couples light signal 118-$i$ into fiber bus 104.

Light signal 118-$i$ includes light signal 312-$i$ as well as light signal 118-$i$+1, which is received from upstream sensor 106-$i$+1 and combined with light signal 312-$i$ at wavelength filter 304-$i$.

It should be noted that, as light signal 118 travels along the downstream direction through the series of sensors 106, it contains more of the wavelength bands originally contained in light signal 116-1 since, at each sensor 106-$i$, a reflected portion 312-$i$ is added to light signal 118-$i$+1. For example, light signal 118-3 includes all of wavelength bands $\lambda$3 through $\lambda$N when it arrives at sensor 106-2. After passing through sensor 106-2, however, light signal 312-2, which contains wavelength band $\lambda$2, is combined with light signal 118-3 to form light signal 118-2. As a result, light signal 118-2 includes all of wavelength bands $\lambda$2 through $\lambda$N when it arrives at sensor 106-1, where wavelength band $\lambda$1 is added to it to form light signal 118-1. As a result, light signal 118-1 includes all of the wavelength bands of contained in light signal 116-1, as originally provided by source 102; however, each wavelength band is now dependent upon the measurand sensed by each of the sensors.

At operation 205, light signal 118-1 is provided to receiver 108.

Figure 6:
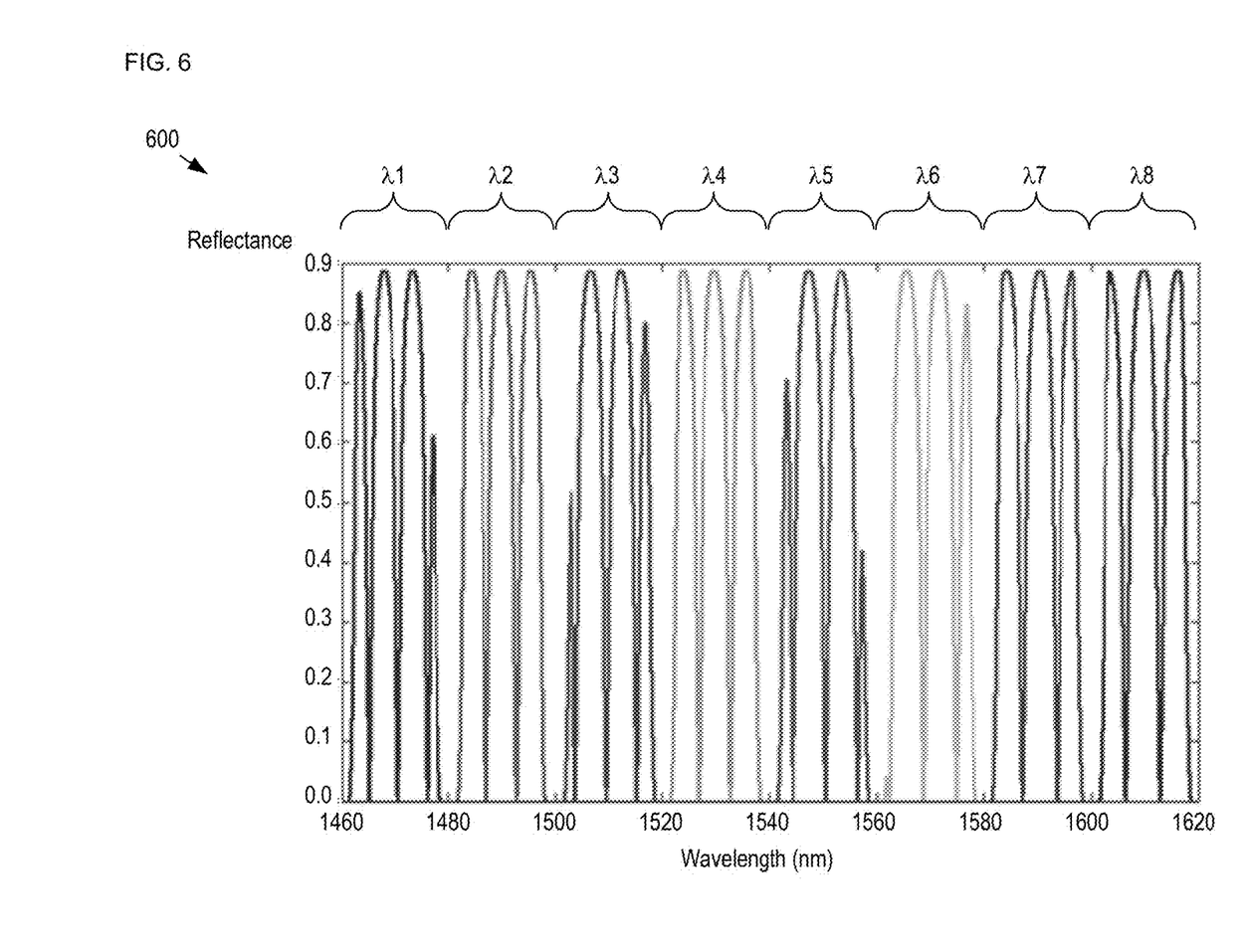
FIG. 6 depicts a typical theoretical response function of a sensor in accordance with the present invention.

FIG. 6 depicts a typical theoretical response function of a sensor in accordance with the present invention. Plot 600 shows the intensity of light signal 118-1 for a network that includes eight sensors 106, where all of the FP sensors 306 have substantially the same response but wavelength filters 304 have a spectral bandwidth of approximately 15 nm and are sequentially offset in wavelength by approximately 20 nm. It should be noted that in reality, some deviation from the ideal would be expected due to losses in the fiber and connectors, etc.

At operation 206, processor 110 processes the output of receiver 108 to measure the wavelength-response function at each of sensors 106 and determine a value for the pressure at each of the sensors.

In order to determine the pressure at each sensor, processor 110 calculates a real-time estimate of the fluctuations in the FP optical cavity length. It should be noted that in order to do this, the spectral bandwidth of each of wavelength filters 304 must be at least the size of one free-spectral range its respective FP sensor 306. One skilled in the art will recognize that the free-spectral range is given by the distance between neighboring reflectance minima in the WRF. A spectral bandwidth of at least one FSR ensures that there will always be one or more minima within the filtered region of each sensor. If changes in the FP sensor result in a minima moving beyond the range of the filter, then another minima will appear on the other side of the filter window. As such, it is possible to always use the positions of these peaks to generate an estimate of the sensor cavity length.

Processor 110 measures the fluctuations in the cavity lengths of the FP sensors by detecting the minima in their respective reflectance functions. The positions of these can be determined by any of a number of methods that are used to detect peaks or valleys in spectral functions. The positions of these minima are determined by the relation:

$$\lambda_n = \frac{2d}{n}$$

where the integer n is called the "order" of the given minima. In the proposed approach, there is one or more minima within each filter window. Once the positions of the minima are determined, these positions are tracked over time to provide a measure of the cavity length. As long as the position of a given order does not vary by more than ½ of a FSR between samples, the individual orders can easily be tracked.

Figure 7A:
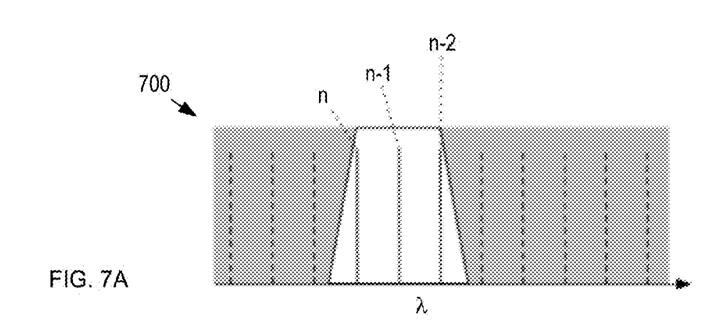
FIGS. 7A-C depict plots of minima in the wavelength-response function of a sensor detected at three different times in accordance with the illustrative embodiment of the present invention.
Figure 7B:
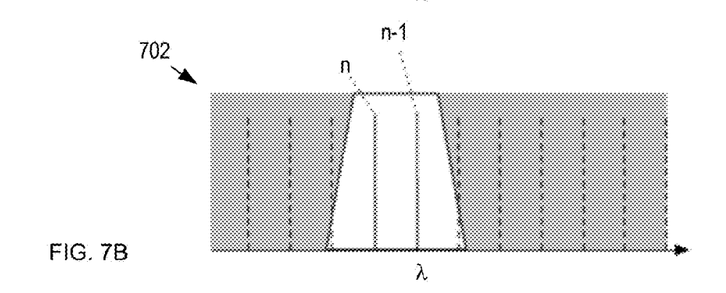
Figure 7C:
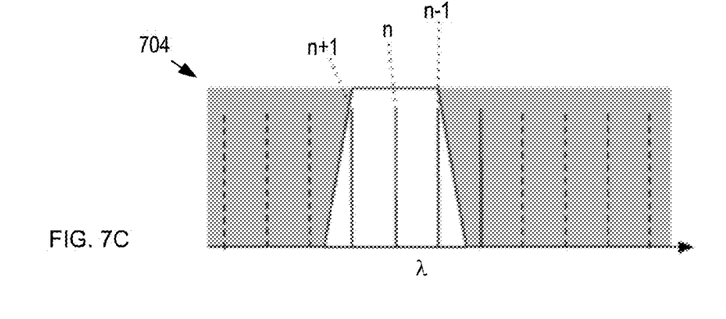

FIGS. 7A-C depict plots of minima in the wavelength-response function of a sensor detected at three different times in accordance with the illustrative embodiment of the present invention. Plots 700, 702, and 704 show three different time samples wherein the wavelength of the respective orders has changed due to changes in the optical cavity length. It can be seen that, as long as the change is less than one half of one free-spectral range, the orders can be readily tracked as they come and go within a given filter window.

In some embodiments of the present invention, sensors 106 are combined with a plurality of fiber-Bragg grating-based sensors in series. It should be noted, however, that in such embodiments, the FBG sensors must be active for wavelengths that are outside the passband of any of wavelength filters 304.

Figure 8:
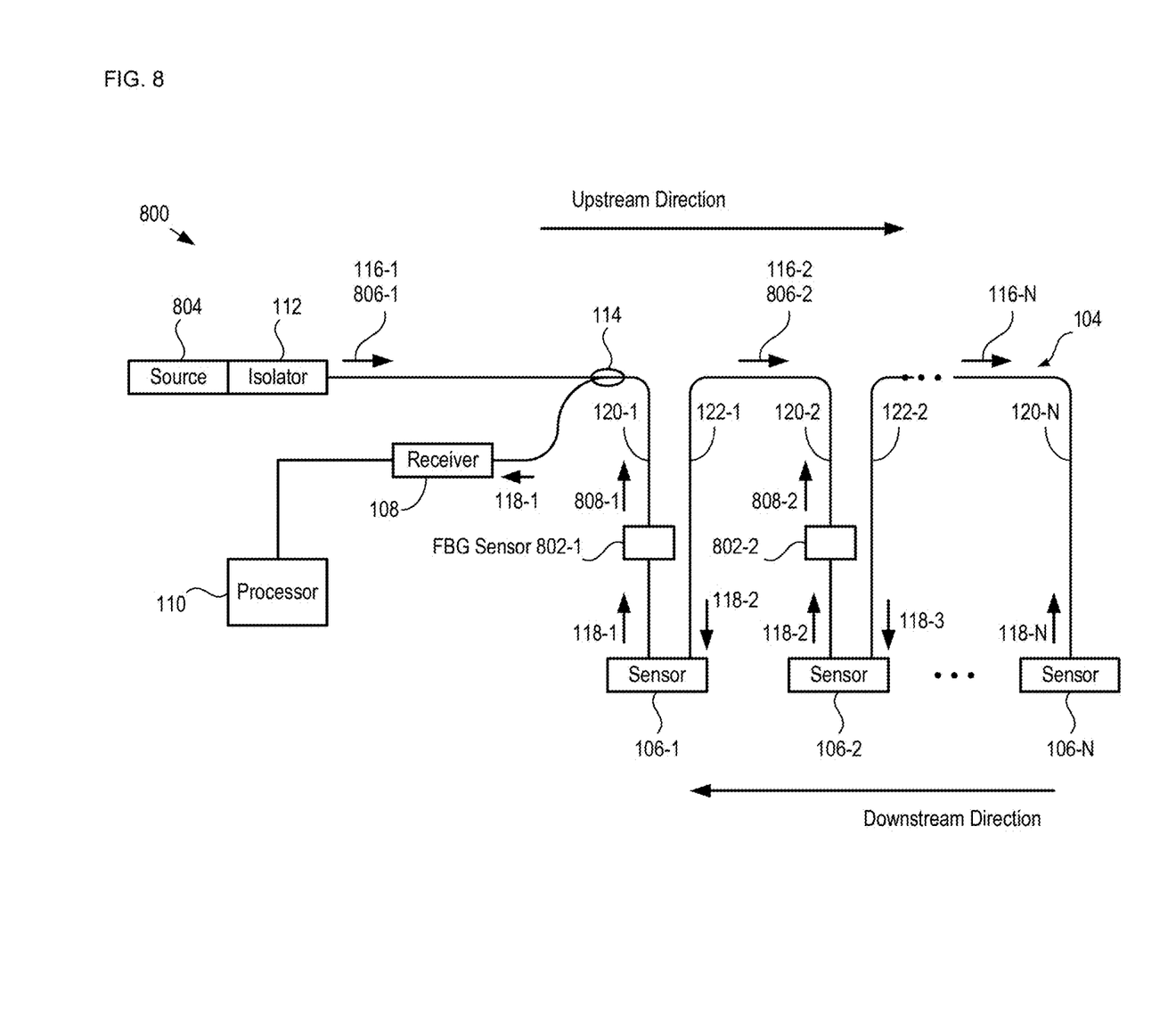
FIG. 8 depicts a schematic drawing of a sensor network in accordance with an alternative embodiment of the present invention.

FIG. 8 depicts a schematic drawing of a sensor network in accordance with an alternative embodiment of the present invention. Network 800 includes network 100, FBG sensors 802-1 and 802-2, and source 804. Each of FBG sensors 802-1 and 802-2 is optically coupled with fiber bus 104 such that it is in series with at least one of sensors 106. Although the depicted example, includes two FBG sensors 802, it will be clear to one skilled in the art, after reading this Specification, how to specify, make, and use alternative embodiments of the present invention that include any practical number of FBG sensors.

Each of FBG sensors 802-1 and 802-2 (referred to, collectively, as FBG sensors 802) is a conventional fiber-Bragg-grating sensor that is dimensioned and arranged for measuring temperature, which is operative at a wavelength outside of the collective passband of wavelength filters 304 of sensors 106-1 through 106-N. As described above and with respect to FIG. 6, sensors 106 operate at wavelength bands $\lambda 1$ through $\lambda 8$ and collectively define a passband within the range of approximately 1460 nm to approximately 1620 nm. In the depicted example, FBG sensors 802-1 and 802-2 operate at wavelength bands $\lambda 9$ and $\lambda 10$, which are centered at 980 nm and 1310 nm respectively. It should be noted, however, that these wavelengths are merely exemplary and that any suitable wavelength outside of the collective passband of sensors 106 can be used for any of FBG sensors 802 without departing from the scope of the present invention. Furthermore, although FBG sensors 802 are sensitive to temperature, at least one of the FBG sensors can be operative for measuring a different measurand without departing from the scope of the present invention.

Source 804 is analogous to source 102 described above; however, in addition to providing light signal 116-1, source 804 also provides wavelength bands $\lambda 9$ and $\lambda 10$, which collectively define light signal 806-1.

In operation, source 804 launches light signals 116-1 and 806-1 into fiber bus 104 via coupler 114. At FBG sensor 802-1, which is included in input fiber portion 120-1, wavelength band $\lambda 9$ is reflected back in the downstream direction as sensor signal 808-1. The remaining wavelength bands in light signals 116-1 and 806-1 are passed to sensor 106-1.

As described above and with respect to system 100, sensor 106-1 is operative for wavelength band $\lambda 1$ and all other wavelengths are passed, substantially unperturbed, into output fiber portion 122-1. Output fiber portion 122-1 is optically coupled with input fiber portion 120-2 via fiber bus 104; therefore, wavelength bands $\lambda 2$-$\lambda 8$ and $\lambda 10$ are received at FBG sensor 801-2, which is included in input fiber portion 120-2.

At FBG sensor 802-2, wavelength band $\lambda 10$ is reflected back in the downstream direction as sensor signal 808-2 while the remaining wavelength bands in light signals 116-1 and 806-1 (i.e., $\lambda 2$-$\lambda 8$) are passed to the remaining sensors 106 in system 800 via output fiber portion 122-2.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for measuring a property, the method comprising:
   (1) providing a first light signal from a source, the first light signal comprising a first plurality of wavelength bands including a first wavelength band and a second wavelength band;
   (2) receiving the first light signal at a plurality of sensors that is arranged in a serial arrangement that is optically coupled with each of the source and a receiver via a first fiber portion;
   (3) at a first sensor of the plurality thereof, the first sensor including a first wavelength-selective filter and a first Fabry-Perot (FP) sensor;
      (i) providing the first light signal to the first wavelength-selective filter as a first free-space signal;
      (ii) passing only the first wavelength band through the first wavelength-selective filter to the first FP sensor;
      (iii) reflecting the second wavelength band at the first wavelength-selective filter to a second sensor of the plurality thereof; and
      (iv) reflecting the first wavelength band at the first FP sensor as a second light signal that is based on a first measurand;
   (4) at the second sensor of the plurality thereof, the second sensor including a second wavelength-selective filter and a second FP sensor;
      (i) providing the second light signal to the second wavelength-selective filter as a second free-space signal;
      (ii) passing only the second wavelength band through the second wavelength-selective filter to the second FP sensor; and
      (iii) reflecting the second wavelength band at the second FP sensor as a third light signal that is based on a second measurand;
   (5) receiving the second light signal and third light signal from the serial arrangement at the receiver;
   (6) determining a wavelength-response function for each of the second light signal and third light signal; and
   (7) estimating a value for each of the first measurand and the second measurand.

2. The method of claim 1 further comprising:
   (8) providing the first FP sensor such that it is characterized by a first free-spectral range;
   (9) providing the second FP sensor such that it is characterized by a second free-spectral range;
   wherein the first light signal, the first FP sensor, and the second FP sensor are provided such that the first free-spectral range is less than or equal to the spectral width of the first wavelength band and the second free-spectral range is less than or equal to the spectral width of the second wavelength band.

3. The method of claim 1 wherein the value for the first measurand is estimated by operations comprising:
   determining a first wavelength at which the magnitude of the second light signal is a minimum at a first time; and
   estimating the value for the first measurand based on the first wavelength.

4. The method of claim 3 wherein the value for the first measurand is estimated by operations further comprising:
   determining a second wavelength at which the magnitude of the second light signal is a minimum at a second time;
   estimating a change in the first cavity length based on the difference between the first wavelength and the second wavelength; and
   estimating a change in the first measurand based on the change in the first cavity length.

5. The method of claim 1 further comprising:
   (8) providing the first light signal such that it includes a third wavelength band;
   (9) providing the third wavelength band to fiber-Bragg grating (FBG) sensor; and
   (10) estimating a value for a third measurand at the FBG sensor.

6. The method of claim 1 wherein the first light signal is provided such that it is characterized by a center wavelength that sweeps through a wavelength range during each of a plurality of time periods, the wavelength range including the first wavelength band and the second wavelength band.

7. A sensor network comprising:
   a source for providing a first light signal, the first light signal including a first plurality of wavelength bands; and
   a plurality of sensors that is arranged in a serial arrangement that is optically coupled with the source via a first fiber portion, each sensor being a reflective sensor and comprising;
      an input fiber portion;
      an output fiber portion;
      a collimator that is optically coupled with each of the input and output fiber portions;
      a wavelength filter that is optically coupled with the first fiber portion, wherein the wavelength filter is optically coupled with the collimator via free space; and
      a Fabry-Perot (FP) sensor that is optically coupled with the wavelength filter via free space, the FP sensor being sensitive for one of a plurality of measurands;
      wherein the wavelength filter is configured to pass only a different one of a second plurality of wavelength bands to its respective FP sensor and reflect the remaining wavelength bands of the second plurality thereof to the collimator, and wherein the first plurality of wavelength bands includes the second plurality of wavelength bands; and
   a receiver that is optically coupled with the serial arrangement via the first fiber portion.

8. The sensor network of claim 7 wherein at least one FP sensor of the plurality thereof is sensitive for a first measurand of the plurality of measurands, and wherein at least one FP sensor of the plurality thereof is sensitive for a second measurand of the plurality of measurands.

9. The sensor network of claim 7 further comprising a processor that is operative for (i) determining the characteristics of a first wavelength-response function of a first sensor of the plurality thereof and (ii) determining a magnitude of a first measurand of the plurality of measurands based on the first wavelength-response function.

10. The sensor network of claim 7 wherein the FP sensor of a first sensor of the plurality thereof is characterized by a first free-spectral range, and wherein the wavelength filter of the first sensor has a spectral bandwidth equal to or greater than the first free-spectral range.

11. The sensor network of claim 7 further comprising a fiber-Bragg grating (FBG) sensor that is operative for a first wavelength band, wherein the first wavelength band is included in the first plurality of wavelength bands and excluded from the second plurality of wavelength bands, and wherein the FBG sensor is optically coupled in series with the plurality of sensors.

12. The sensor network of claim 11 wherein the at least one fiber portion includes an input fiber portion, and wherein the FBG sensor is included in the input fiber portion.

13. The sensor network of claim 7 wherein the source comprises a swept-wavelength light source.

14. A sensor network comprising:
   a source for providing a first light signal, the first light signal including a first wavelength band and a plurality of wavelength bands that excludes the first wavelength band;
   a receiver that is operative for detecting each of the plurality of wavelength bands;
   a plurality of sensors that is arranged in a serial arrangement, each sensor being a reflective sensor and comprising;
      a first fiber portion that is one of an input fiber portion and an output fiber portion, wherein the first fiber portion is optically coupled with the source;
      a wavelength filter that is optically coupled with the first fiber portion via free space; and
      a Fabry-Perot (FP) sensor that is optically coupled with the wavelength filter, the FP sensor being sensitive for one of a plurality of measurands;
      wherein each wavelength filter of the plurality thereof is configured to pass only a different one of a second plurality of wavelength bands to its respective FP sensor as a first free-space light signal and reflect the remaining wavelength bands of the second plurality thereof as a second free-space light signal, and wherein the first plurality of wavelength bands includes the second plurality of wavelength bands; and
   a first fiber-Bragg grating (FBG) sensor that is operative for the first wavelength band;
   wherein the serial arrangement and each of the source, receiver, and the first FBG sensor are optically coupled in series via a second fiber portion.

15. The sensor network of claim 14 further comprising a second FBG sensor that is operative for a second wavelength band, wherein the first light signal includes the second wavelength band and the plurality of wavelength bands that excludes the second wavelength band, and wherein the plurality of sensors and the second FBG sensor are optically coupled in series.

* * * * *